United States Patent
Lahey et al.

(10) Patent No.: US 9,414,539 B2
(45) Date of Patent: Aug. 16, 2016

(54) DOOR PROP IN A LAWN MOWER

(71) Applicant: Husqvarna AB, Huskvarna (SE)

(72) Inventors: Clint N. Lahey, Ponte Vedra Beach, FL (US); Lennie D. Rhoades, Charlotte, NC (US); Nicholas B. Hansen, Fayetteville, GA (US); Matthew M. Lambert, Harrisburg, NC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/480,681

(22) Filed: Sep. 9, 2014

(65) Prior Publication Data

US 2014/0373499 A1    Dec. 25, 2014

Related U.S. Application Data

(63) Continuation of application No. 14/067,346, filed on Oct. 30, 2013, now Pat. No. 8,857,142, which is a continuation of application No. 13/146,114, filed as application No. PCT/US2009/031996 on Jan. 26, 2009, now Pat. No. 8,578,691.

(51) Int. Cl.
| | |
|---|---|
| A01D 43/063 | (2006.01) |
| A01D 34/00 | (2006.01) |
| A01D 34/71 | (2006.01) |
| A01D 34/82 | (2006.01) |
| A01D 43/06 | (2006.01) |

(52) U.S. Cl.
CPC .............. *A01D 34/001* (2013.01); *A01D 34/71* (2013.01); *A01D 34/82* (2013.01); *A01D 43/06* (2013.01); *A01D 43/063* (2013.01); *A01D 43/0631* (2013.01)

(58) Field of Classification Search
USPC ............................................. 56/202
See application file for complete search history.

(56) References Cited

U.S. PATENT DOCUMENTS

| 3,636,686 A | 1/1972 | Meyer et al. |
| 3,721,078 A | 3/1973 | Haffner |

(Continued)

FOREIGN PATENT DOCUMENTS

| DE | 9411192 U1 | 9/1994 |
| EP | 0903074 A1 | 3/1999 |

OTHER PUBLICATIONS

International Preliminary Report on Patentability for PCT/US2009/031996 issued Jul. 26, 2011, all enclosed pages cited.

(Continued)

*Primary Examiner* — Alicia Torres
(74) *Attorney, Agent, or Firm* — Nelson Mullins Riley & Scarborough LLP

(57) ABSTRACT

A mower for cutting grass includes a platform with a motor located thereon. A door on the platform has a first position blocking a discharge and a second door position away from the discharge. A bag has an inlet that mates to a discharge. A support is connected to the platform and a door prop is movably mounted on the support. The door prop has a first position not in engagement with the door to permit the door to be in the first position and having a second position in which a segment of the door prop engages with the door to retain the door in the second position. A handle extends up from the platform. An operable member is mounted on the handle. A connector extends between the door prop and the operable member to transmit force to move the door prop.

20 Claims, 10 Drawing Sheets

(56) References Cited

U.S. PATENT DOCUMENTS

| | | |
|---|---|---|
| 3,893,284 A | 7/1975 | Thon et al. |
| 3,949,540 A * | 4/1976 | Christopherson .... A01D 43/063 56/202 |
| 3,962,852 A | 6/1976 | Boyer |
| 4,470,246 A | 9/1984 | Donegan |
| 4,478,031 A | 10/1984 | Wolf |
| 4,897,988 A | 2/1990 | Schweitz et al. |
| 5,040,364 A * | 8/1991 | Deegan .............. A01D 43/0631 56/320.2 |
| 7,448,195 B2 | 11/2008 | Kohler |
| 2003/0182919 A1 | 10/2003 | Baumann |
| 2005/0284121 A1 | 12/2005 | Lida et al. |

OTHER PUBLICATIONS

International Search Report and Written Opinion of PCT/US2009/031996 mailed on Oct. 16, 2009, all enclosed pages cited.

\* cited by examiner

DOOR PROP IN A LAWN MOWER

PRIORITY CLAIM

This application is a continuation of U.S. patent application Ser. No. 14/067,346 filed Oct. 30, 2013, which is a continuation of U.S. patent application Ser. No. 13/146,114 filed Jan. 26, 2009 (now granted as U.S. Pat. No. 8,578,691 which issued on Nov. 12, 2013); which is a national phase entry of PCT/US2009/031996 filed Jan. 26, 2009.

FIELD OF THE INVENTION

The present invention relates generally to a lawn mower, and more particularly, to a lawn mower that has a movable door that can either block a mower deck discharge or expose the discharge for mating of the discharge with an inlet of a collection bag.

BACKGROUND OF THE INVENTION

Walk-behind lawn mowers are well-known. Such a lawn mower may have a discharge opening from a mower deck that directs cut grass into a collection bag. Also, the lawn mower may have a door to block the discharge opening. Often the door is kept closed to allow the lawn mower to operate in a mulching function. Often such a door is spring-biased to the closed position.

A common problem of removing and installing the collection bag on the walk-behind mower is the spring-biased door. The door must be held completely open while removing or installing the grass bag. Also, the door should be closed if the grass bag is not present and the mower is to be operated.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a walk-behind mower for cutting grass. The mower includes a cutting platform within which grass is cut and which has a rearwardly directed discharge for cut grass. A motor is located on the cutting platform for powering the grass cutting operation. A door is movably mounted to the cutting platform. The door has a first door position in which the door blocks the discharge and a second door position in which the door is away from the discharge.

The mower also includes a collection bag for receiving and retaining cut grass. The collection bag has an inlet mating to the discharge of the cutting platform with the collection bag attached to the cutting platform and with the door being away from the first position. A support is connected to the cutting platform. A door prop is movably mounted on the support and has a segment for engagement with the door. The door prop has a first prop position in which the segment of the door prop is not in engagement with the door to permit the door to be in the first door position and having a second prop position in which the segment of the door prop is in engagement with the door to retain the door in the second door position. A handle extends up from the cutting platform for gripping by an operator walking behind the mower in an operator location for operating the mower. An operable member is mounted on the handle and operable by the operator when the operator is in the operator location. A connector extends between the door prop and the operable member to transmit force from the operable member to the door prop and move the door prop from the second prop position to the first prop position when the operable member is operated, and releasing the door prop to move toward the second prop position when the operable member is released from operation.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Figure 1:
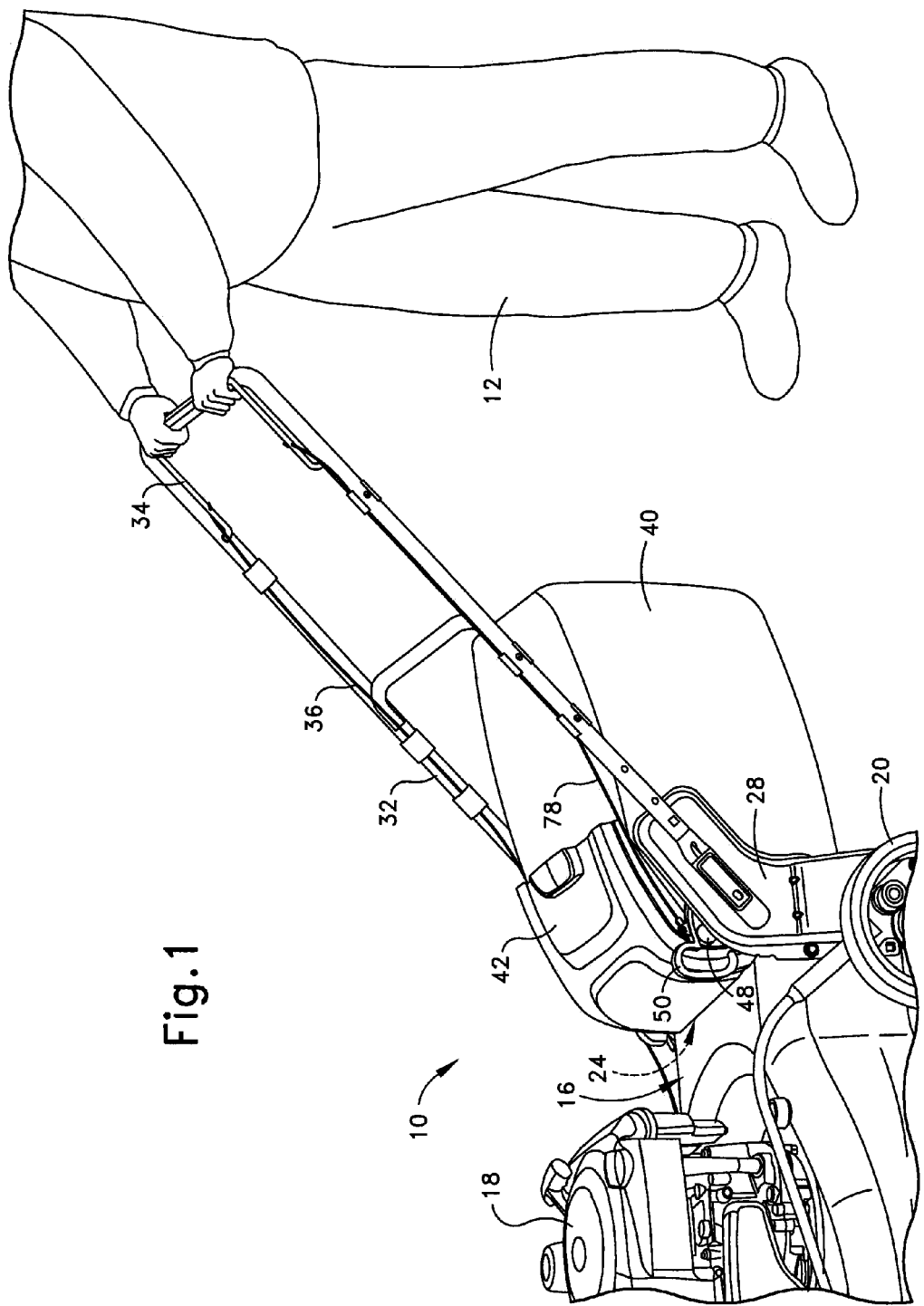
FIG. 1 is a side perspective view of a walk-behind mower that includes an example of the present invention and also shows an operator located at an operator position.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

A walk-behind lawn mower 10 in accordance with one aspect of the present invention is shown in FIG. 1 along with an operator 12 located in an operator location. The lawn mower 10 includes a cutting platform 16 onto which a motor 18 is located. As can be appreciated, the motor 18 powers one or more cutting blades (not shown) that are located within the cutting platform 16 for cutting grass. In one example, the motor 18 drives the blade(s) to rotate. The blade(s) has sharpened portions. The rotating blade(s) are brought to bear against grass as the mower 10 is moved across a lawn. Thus, the motor 18 powers the grass cutting operation. The cutting platform 16 is generally supported by a plurality of ground engaging wheels 20 (only one visible). These wheels 20 may be freely rotatable or may be powered via a drive connection to the motor. The motor 18 may be of various constructions and configurations such as electric, fuel-powered, or other. Also, the one or more blades may have various constructions and configurations. Still further, the cutting platform 16 may have various configurations and features. In general, the cutting platform 16, motor 18, cutting blades may have known structures and features and may also have additional structures and features that are not shown herein.

One feature that the cutting platform 16 does have is a rearwardly directed discharge 24 for cut grass. The orientation of rearwardly is with respect to the normal direction that the walk-behind mower 10 moves during the cutting operation. With reference to FIG. 1, a forward direction for the mower 10 would be to the left and the rearward direction would be to the right. It should be appreciated that the discharge 24 may have a variety of configurations, shapes, placements etc. on the rear side of the cutting platform 16.

Also located at the rear side of the cutting platform 16 is at least one handle support 28 that is connected to the cutting platform. In the presented example, there are two supports 28 being located respectively on the left and right sides of the cutting platform 16. The supports 28 may have any of various constructions and configurations. In the shown example, each support 28 is a generally plate-like structure which may have one or more reinforcement segments provided via bending or contouring of the material. Each support 28 is shaped very generally as the letter "L," but with the letter turned on one side. In general, the material is typically metal. However, different materials such as plastic composite may be utilized. A plurality of mounting holes, apertures, studs, weld points or the like are located on each support. These holes, etc. on a lower portion of the respective support 28 provide means to connect each support to the cutting platform 16.

An upper portion of each support 28 extends generally upwardly and rearwardly away from the cutting platform 16. Attached to the upper portion of each support 28 is an operator handle 32. In the presented example, the operator handle 32 extends upwardly in a general U-shape from the cutting platform 16. The U-shape may be bifurcated to permit folding of the handle for storage. An upper portion of the handle 32 is at a generally ergonomic location to be held or gripped by the operator 12 who is located in an operator location directly behind the mower 10 and who is operating the mower. One or more operation components may be mounted upon the handle 32 for operation by the operator 12 to control the mower 10. Examples of such components include throttle, speed control, and the like. Accordingly, the operator handle 32 may have any of several configurations and constructions.

Also located on the handle 32 adjacent to the upper portion of the handle is an operator presence bail or blade brake/clutch control member 34. Specifically, such member 34 is pivotally mounted to the upper portion of the handle 32 such that the operator 12 moves the member 34 to an operation present position when the operator is at the operator location and intends to operate the walk behind mower for cutting grass. Thus, the member 34 is an operable member 34. In the shown example, the member 34 is a movably mounted U-shaped member that is connected to the handle 32 via a movable mount. Specifically, the movable mount is a pivot mount such that the member 34 can pivot between a first position up/away from the grip area of the handle and a second position located against/adjacent to the grip area of the handle. Hereinafter, the member 34 is referred to as the operator presence bail 34 with the understanding that the structure may be different from the shown example. It is to be noted that FIG. 1 shows the operator presence bail 34 in the second position (i.e., located against/adjacent to the grip area of the handle). The operator presence bail 34 is connected, via a cable 36 or the like, to one or more components of the mower 10 that concern operation of the mower. For example, a blade brake, and/or clutch mechanism may be provided such that the blade is only operated when the operator presence bail is actuated and in the second position as shown in FIG. 1. This occurs when the operator is in the operator presence position and gripping the handle 32 for operation.

Turning back to the cutting platform 16 and the rearwardly directed discharge 24 therein, a bag mount (not shown) is located on the cutting platform adjacent to the discharge. The bag mount is for attaching a collection bag 40 onto the rearward side of the cutting platform. It is to be appreciated that the bag mount may have any of several constructions and configurations, including a receiving means for receiving pins located on the collection bag, and the like. Also, it is to be appreciated that the collection bag 40 may have any of several constructions and configurations. In general, the collection bag receives the cut grass as the cut grass passes from the discharge 24. Accordingly, the collection bag 40 merely has an inlet that mates with the discharge 24 of the cutting platform 16 when the collection bag is located on the bag mount of the cutting platform.

A door 42 is movably mounted to the cutting platform 16. In the shown example, the door 42 is pivotable about an axis 44 (see FIG. 2) that runs horizontally along a rearward and upper edge of the cutting platform 16. Thus, the door 42 is capable of pivoting in an arc about the rearward and upward edge of the cutting platform 16. Specifically, the door 42 is pivotable to a first door position (shown in FIG. 2) in which the door blocks the discharge 24 of the cutting platform 16. As can be appreciated, with the door 42 in the first door position, both ingress and egress through the discharge 24 of the cutting platform 16 is prevented. This door position is useful for a mulching function. In the shown example, a spring bias means 46 is provided on the cutting platform at the door 42. The spring bias means 46 biases the door 42 into the first door position in which the door blocks the discharge. The spring bias means 46 may have any construction or configuration. In one example, the spring bias means 46 is a torsion spring. The door 42 is pivotable upwardly and forwardly away from the first door position. The pivoting motion includes movement to at least a second door position (see FIG. 3) in which the door is located away from the discharge. It should be appreciated that the door 42 may have other positions, such as the door position shown in FIG. 4.

A projecting portion 48 of the door 42 is located on the side of the door and projects to the side. In the shown example, the projecting portion 48 is on the closest side of the door 42. The projecting portion 48 located a short distance from the pivot axis 44. Thus as the door 42 pivots about the axis 44, the projecting portion 48 travels in an arc about the axis 44.

Figure 5:
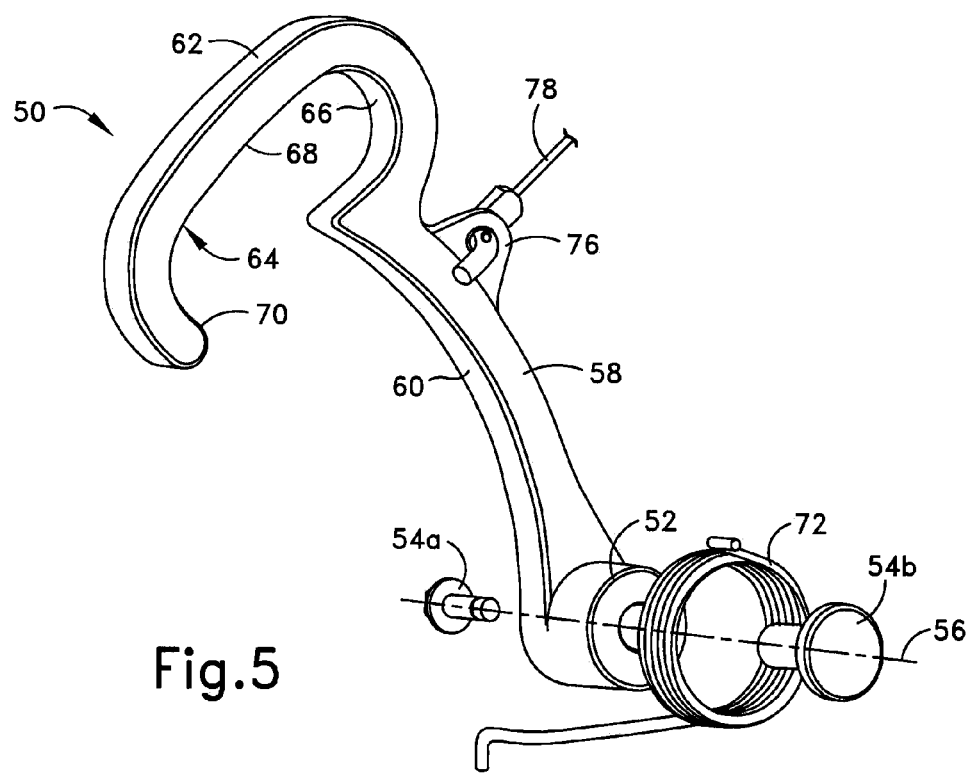
FIG. 5 is an enlarged and exploded view of a door prop of the mower shown in FIG. 1.

A door prop 50 (FIG. 1) is movably mounted on one of the supports 28. An example door prop 50 is shown in detail in FIG. 5. The door prop 50 has a first portion 52 for movably mounting the door prop on the support. The first portion 52 of the door prop has an aperture through which a fastener arrangement 54a, 54b extends. The fastener arrangement 54a, 54b also extends through the support such that the door prop 50 is pivotally moveable about the fastener arrangement 54a, 54b. Thus, the fastener arrangement provides a pivot axis 56. In the shown example, the fastener arrangement 54a, 54b has two portions that are secured together, such as by threaded engagement. It is to be understood that various other constructions or configurations could be used.

The example door prop 50 has a second portion 58 that extends away from the first portion 52 and thus extends away from the pivot location. In the shown example, the extending second portion 58 has a general arc shape. In particular, the extending second portion has a surface 60 that extends in an arc.

At a distal end of the extending second portion 58 is a generally hook-like portion 62, which is a third portion of the door prop 50. The hook-like third portion 62 has an inner surface 64 that has a generally one-half circle curved segment 66, a generally straight forwardly-extending segment 68, and a generally downwardly curved extending nose segment 70.

It is to be noted that the second and third portions 58, 62 are located in generally the same vertical plane as the projecting portion 48 of the door 42. Thus, the projecting portion 48 of the door 42 can engage with the second and third portions 58, 62 of the door prop 50. In particular, the projecting portion 48 of the door 42 can move (e.g., slide) along the surface 60 of the second portion of the door prop 50. Also, the projecting portion 48 of the door 42 can be located within and thus held by the hook-like third portion 62.

Figure 2:
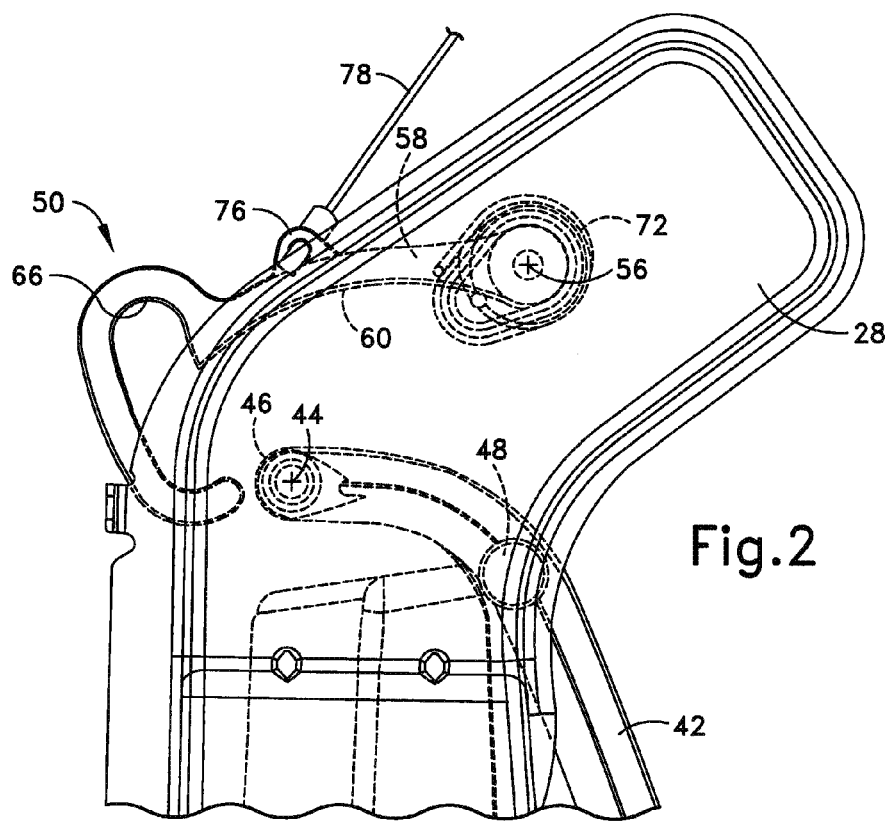
FIG. 2 is an enlarged partial view of the mower of FIG. 1 showing the door prop in a first prop position, a door of the mower is in a first door position and a collection bag is removed.

FIG. 2 shows the door 42 in the downward position and the door prop 50 does not engage the projecting portion 48 of the door. This position of the door prop 50 can be referred to as a first door prop position. It should be appreciated that with the, door in the downward position, the door prop 50 cannot reach the projecting portion 48 of the door 42 and thus the position of the door prop 50 is not particularly relevant.

Figure 3:
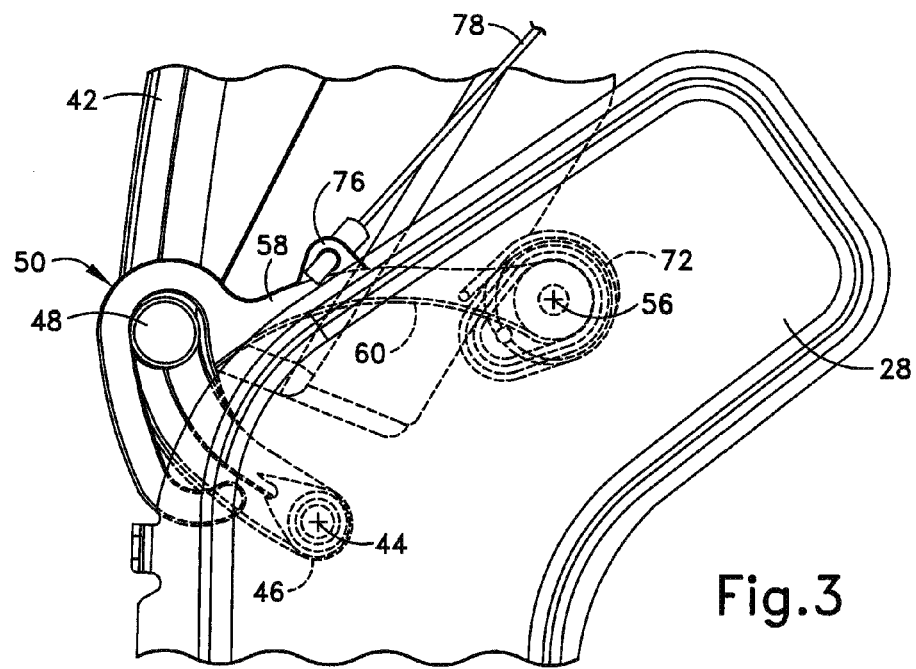
FIG. 3 is a view similar to FIG. 2, but the door prop is in a second prop position and the door is in a second door position.

FIG. 3 shows the door 42 in a second, upward position and the projecting portion 48 is located within the hook-like third portion 62 of the door prop 50. Thus, the door prop 50 holds the door in the second, upward position. This position of the door prop 50 can be referred to as a second door prop position. However, when the door prop 50 is pivoted upward (i.e., counterclockwise as shown in the drawings) and the projecting portion 48 is clear of the curved segment 66 the door 42 has the ability to pivot from the second, upward position back toward the first, downward position. It should be appreciated that the straight segment 68 and the downwardly curved segment 70 on the door prop 50 prevent the door 42 from being rotated so far such that the door prop ceases to be engaged with the projecting portion 48 on the door 42.

Figure 4:
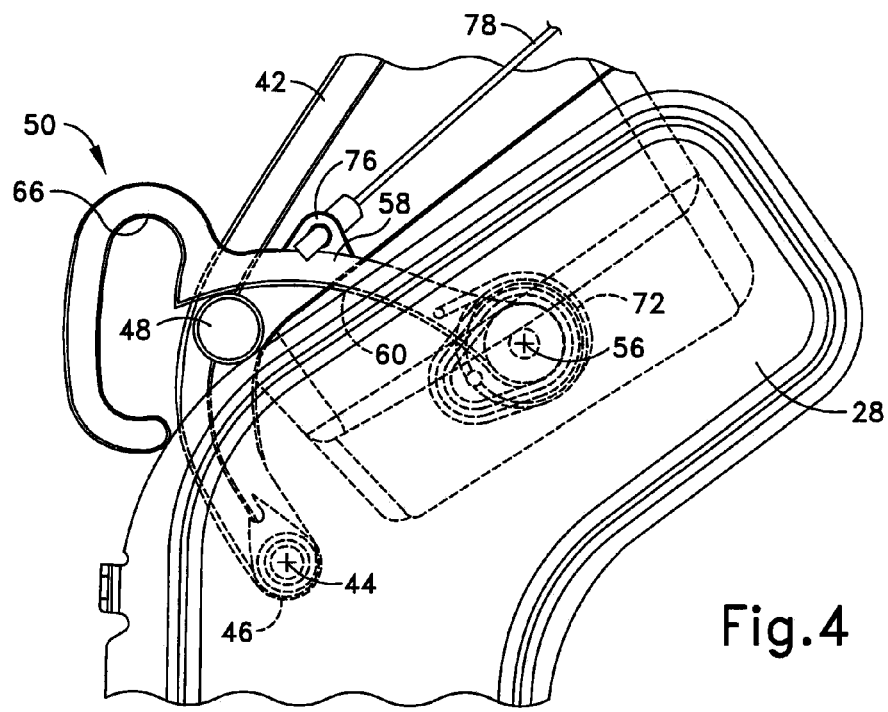
FIG. 4 is a view similar to FIGS. 2 and 3, but the door prop and door are in yet other positions and the bag is attached to the mower.

FIG. 4 shows an intermediate location of the door 42 between the upward position and the downward position. This is the position in which the door 42 rests on top of the collection bag 40. The door prop 50 can rest upon the projecting portion 48 of the door 42. This possibility is shown in FIG. 4. However, since the door prop 50 is resting at its surface 60 of its second portion, the projecting portion is freely able to slide along this surface and the door prop does not prevent movement of the door 42.

A spring bias means 72 operatively coupled between the support 28 and the door prop 50. In the shown example, a spring bias means 72 is a torsion bias spring that has a first end engaged into an aperture on the support 28 and a second end that is in engagement with the door prop 50. The bias spring 72 provides a rotational force to the door prop 50. As shown in the Figures, the bias forces the door prop in the generally counter-clockwise direction about the axis 56 at the fastener arrangement 54a, 54b.

The door prop 50 also has a mounting portion 76 for connection to a cable 78. Within the shown example, the mounting portion 76 is shown at a location approximately at the mid-height of the door prop 50. Specifically, the mounting portion 76 is located generally adjacent to the hook-like third portion 62 of the door prop 50.

Figure 8:
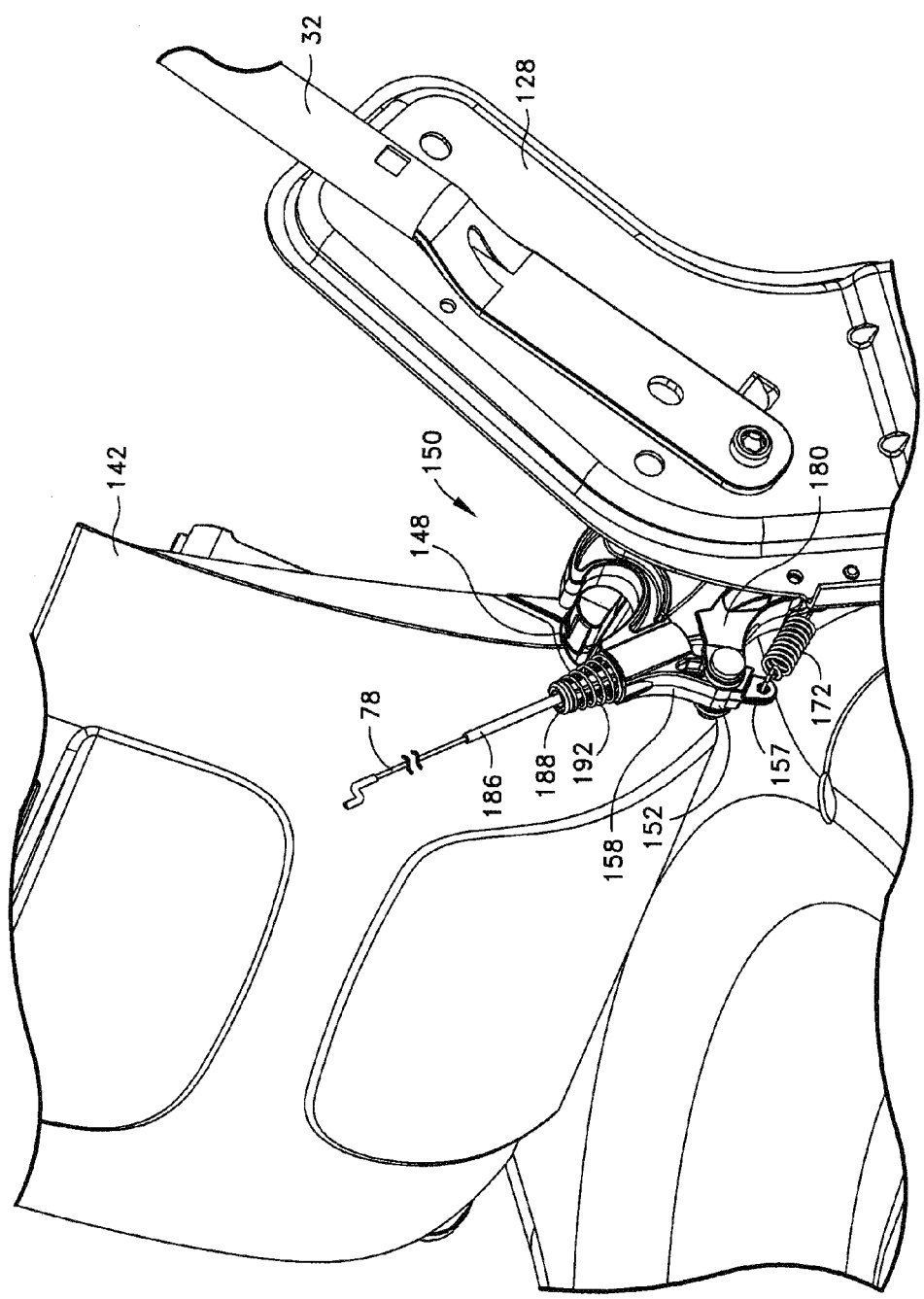
FIG. 8 is an isometric view of an alternative example embodiment of the door prop of the mower shown in FIG. 1.
Figure 9:
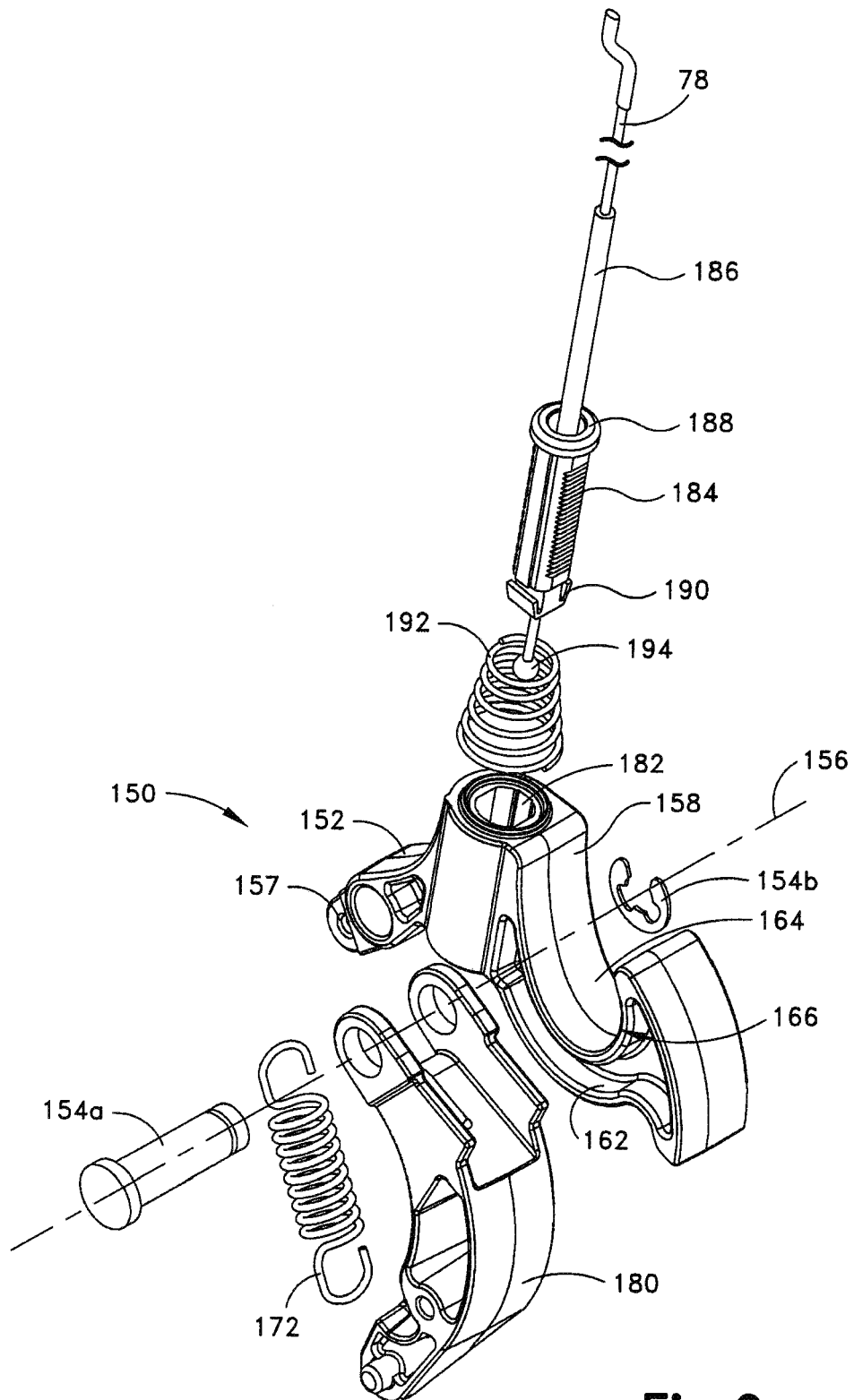
FIG. 9 is an enlarged and exploded view of an alternative example embodiment of the door prop.

In accordance with another aspect of the present invention, a door prop 150 (FIG. 8) is movably mounted on a bracket 180. An example door prop 150 is shown in detail in FIG. 9. The bracket 180 is mounted to the support 128, and it is shaped very generally as the letter "L," but with the letter turned on one side. The bracket 180 defines an aperture with at least two distinct widths or diameters. The upper width of the aperture is smaller in comparison to the lower width.

The door prop 150 has a first portion 152 for movably mounting the door prop on the bracket 180. The first portion 152 of the door prop 150 has an aperture through which a fastener arrangement 154a, 154b. Thus the fastener arrangement provides a pivot axis 156. In the shown example of FIG. 9, the fastener arrangement 154a, 154b has two portions that are secured together, such as by a metal keeper or by threaded engagement. It is to be understood that various other constructions or configurations could be used. Another possible configuration includes the bracket 180 being part of the support 128.

The example door prop 150 has a second portion 158 that extends away from the first portion 152 and thus extends away from the pivot location. In the shown example, the extending second portion 158 defines an aperture 182. The aperture 182 has a wider diameter at its lower end. A length of live conduit 184 is placed within the aperture. The live conduit 184 has a central aperture, a conduit sleeve 186 at its upper end, a collar 188 in the central portion, and hooks 190 at its lower end. These hooks 190 may be squeezed toward the center of the live conduit 184 so that the total width of the conduit and hooks is reduced. The live conduit 184 is placed into the door prop aperture 182, and the hooks return to their normal width as they enter the wider diameter of the door prop aperture 182, holding the live conduit in that position in the door prop aperture. A spring 192 is located between the collar 188 of the live conduit 184 and the door prop 150.

Cable 78 is placed through the live conduit 184, spring 192, door prop aperture 182, and the aperture in the bracket 180. Cable 78 has an end cross section 194, such as a ball shape which is larger than the cross section of the rest of the cable 78. The end cross section 194 is placed in the wider, lower diameter of the bracket 180 aperture. The end cross section 194 of cable 78 is of greater width than the upper aperture diameter in the bracket 180.

The distal end of the second portion 158 of the door prop 150 has a general arc shape. In particular, the extending second portion extends in an arc to form a generally hook-like third portion 162. The hook-like third portion 162 has an inner surface 164 that has a generally one-half circle curved segment 166.

The example door prop 150 has a fourth portion 157 that extends away from the first portion 152 in a direction opposite of the second portion 158 and thus extends away from the pivot location. In the shown example, the extending fourth portion 157 defines an aperture.

A spring bias means 172 operatively coupled between the bracket 180 and the door prop 150. In the shown example, a spring bias means 172 is a tension spring that has a first end engaged into an aperture on the bracket 180 and a second end that is in engagement with the door prop 150. The bias spring 172 provides a rotational force to the door prop 150. As shown in the Figures, the bias forces the door prop in the generally counter-clockwise direction about the axis 156 at the fastener arrangement 154a, 154b.

It is to be noted that the second and third portions 158, 162 are located in generally the same vertical plane as the projecting portion 148 of the door 142. Thus, the projecting portion 148 of the door 142 can engage with the second and third portions 158, 162 of the door prop 150. In particular, the projecting portion 148 of the door 142 can move (e.g., slide) along the surface 166 of the second portion of the door prop 150. Also, the projecting portion 148 of the door 142 can be located within and thus held by the hook-like third portion 162.

Figure 10:
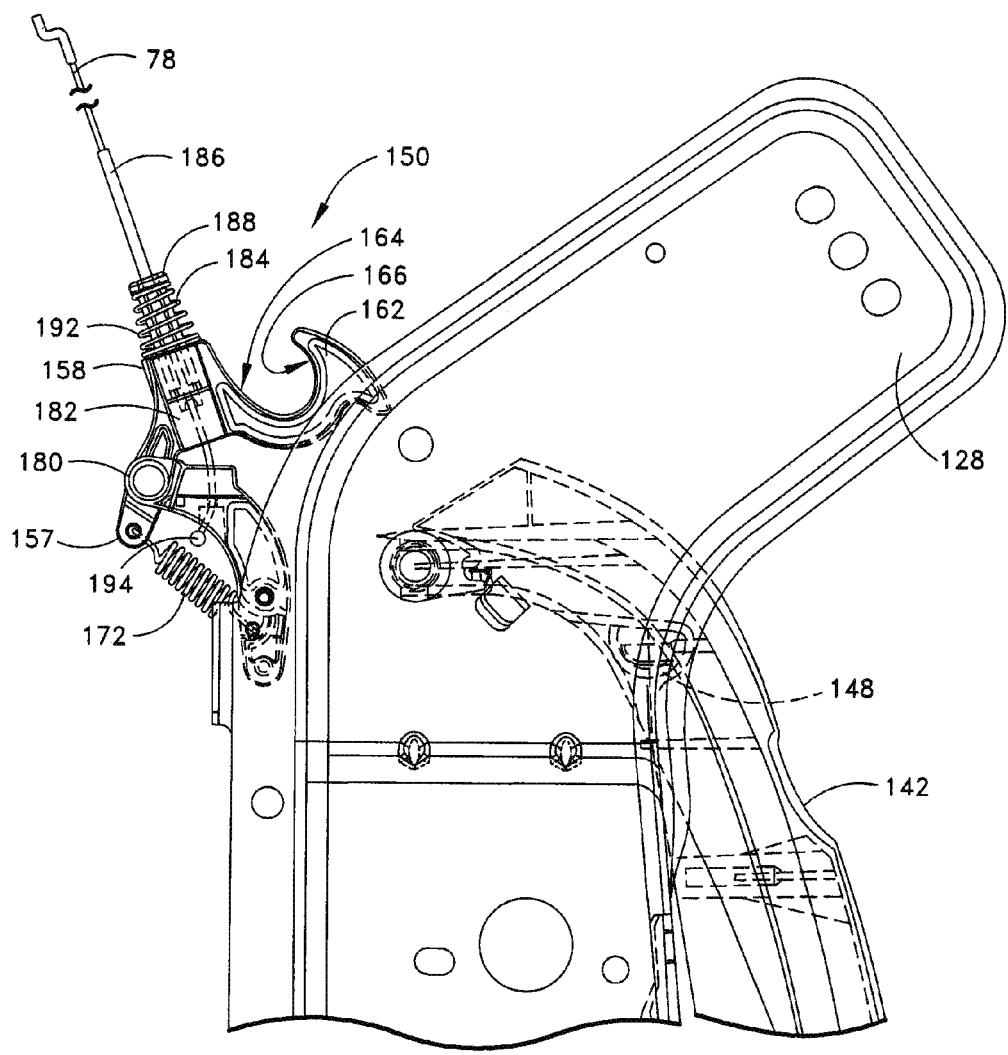
FIG. 10 is an enlarged partial view of the mower of FIG. 1 showing the door prop in a first prop position, a door of the mower in a first door position and a collection bag is removed.

FIG. 10 shows the door 142 in the downward position and the door prop 150 does not engage the projecting portion 148 of the door. This position of the door prop 150 can be referred to as a first door prop position. It should be appreciated that with the door in the downward position, the door prop 150 cannot reach the projecting portion 148 of the door 142 and thus the position of the door prop 150 is not particularly relevant.

Figure 11:
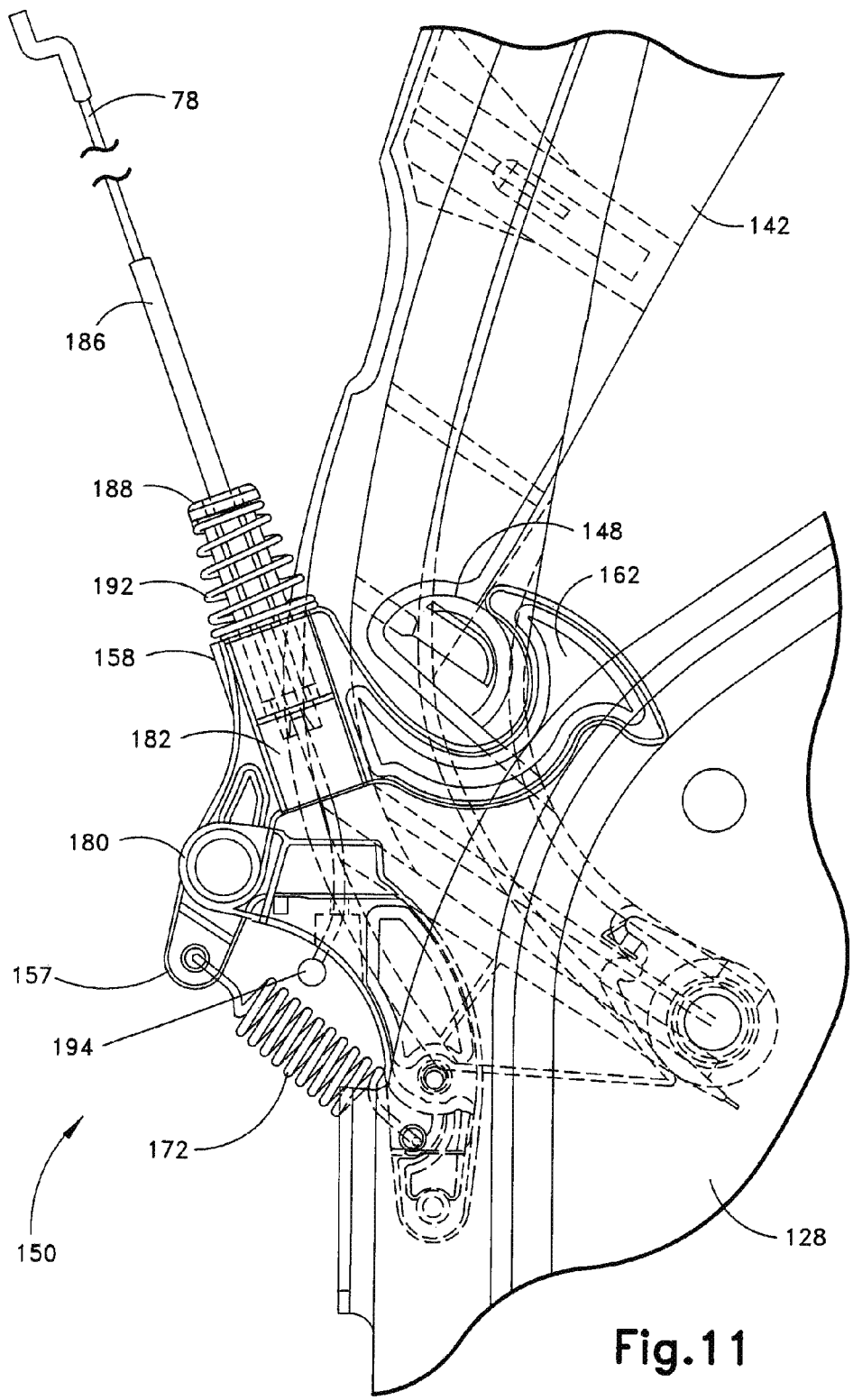
FIG. 11 is a view similar to FIG. 9, but the door prop is in a second prop position and the door is in a second door position.

FIG. 11 shows the door 142 in a second, upward position and the projecting portion 148 is located within the hook-like third portion 162 of the door prop 150. Thus, the door prop 150 holds the door in the second, upward position. This position of the door prop 150 can be referred to as a second door prop position. However, when the door prop 150 is pivoted downward (i.e., clockwise as shown in the drawings) and the projecting portion 148 is clear of the curved segment 166 the door 142 has the ability to pivot from the second, upward position back toward the first, downward position.

Figure 12:
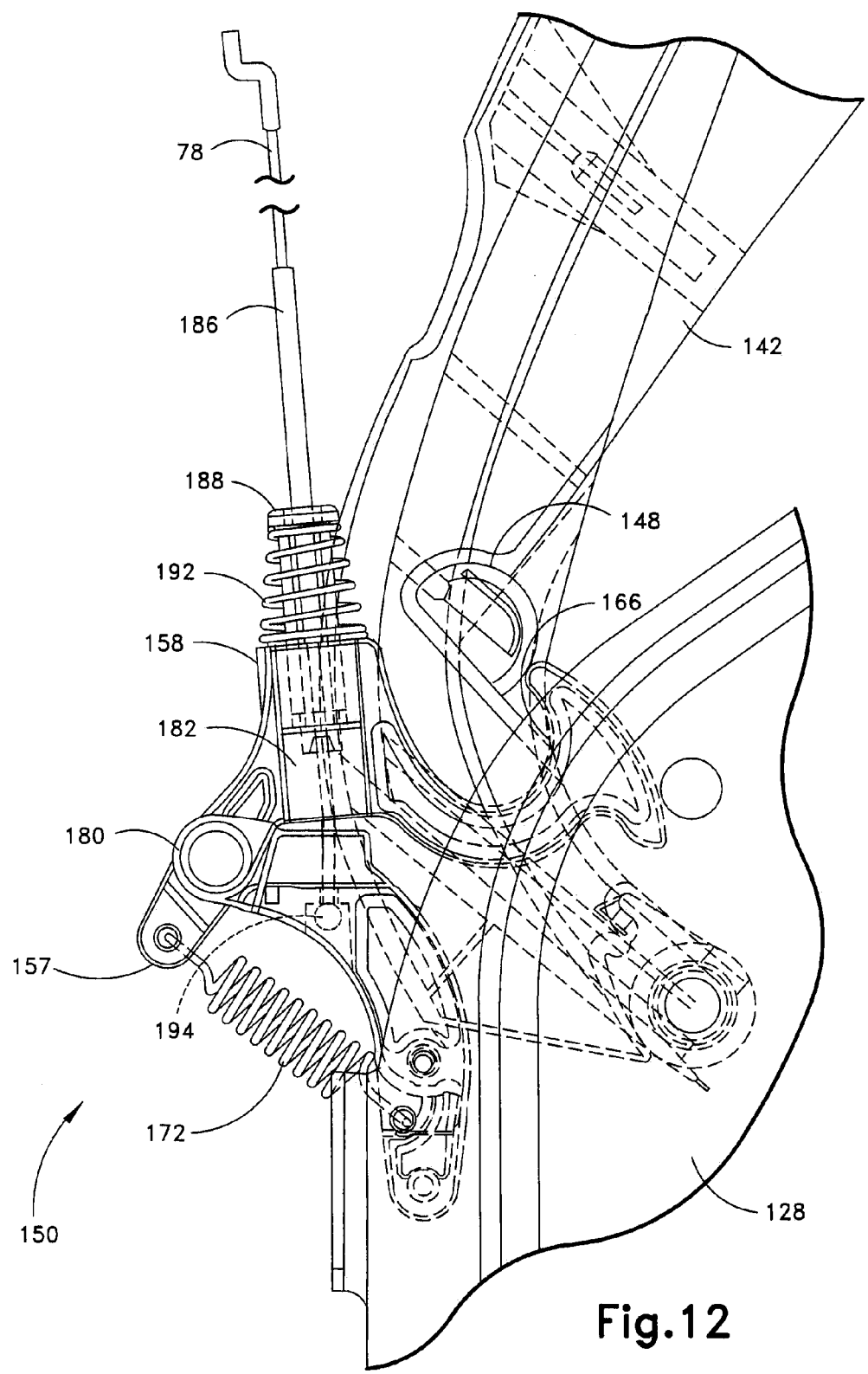
FIG. 12 is a view similar to FIGS. 9 and 10, but the door prop and door are in yet other positions.

FIG. 12 shows an intermediate location of the door 142 between the upward position and the downward position. The operator presence bail 34 (not shown) is actuated, applying a force to cable 78. The door prop 150 has been rotated in the clockwise direction, and the projecting portion 148 has cleared the curved segment 166 of the door prop 150. Further rotation of door prop 150 will allow the door 142 to return to its first, downward position.

Relating to the example shown in FIGS. 2 through 7, the cable 78 extends upwardly along one leg of the handle 32 and extends to the operator presence bail 34 mounted on the handle. Actuation of the operator presence bail 34 transmits a pulling force through the cable 78 and to the door prop 50. Thus, the cable 78 is a connector 78 extending between the door prop 50 and the operator presence bail (i.e., operable member) 34 to transmit force. The pulling force causes the door prop 50 to pivot about the axis 56 in the clockwise direction (with reference to the figures)

Relating to the example shown in FIGS. 8 through 12, the cable 78 extends upwardly along one leg of the handle 32 and extends to the operator presence bail 34 mounted on the handle. Actuation of the operator presence bail 34 transmits a pulling force through the cable 78. If there is any slack in cable 78, upward force pulls the wider cross section end of the cable into the aperture of the bracket 180. The smaller upper diameter of the aperture prevents further movement. Force is then transmitted to the collar of the live conduit 184, exerting a downward force onto the spring. The spring causes the door prop 150 to pivot downward (e.g., clockwise as shown in FIGS. 8-12). Once the door prop 150 has pivoted sufficiently far, the projecting portion 148 of the door 142 is released from the hook-like third portion 162 of the door prop and the door is able to pivot downward under the bias of the spring 46.

It is to be noted that in the shown example, the cable 78 for the door prop 50 is separate from the cable 36 associated with operation of the mower 10. It is to be appreciated that the two cables 36 and 78 may be integrated into a single connector or cable, partially combined, or otherwise linked together. Thus at least a portion of a second connector that is connected to the operator presence bail 34 extends to at least one component of the mower 10 that concern operation of the mower.

It is to be appreciated that the door prop 50 does not even engage the projecting portion 48 of the door 42 when the door is on the downward position (FIG. 2). Thus, the presence of tension in the cable from the operator presence cable does not affect the door 42. With regard to the door 42 being held in the upward position by the door prop 50 (as shown in FIG. 3), the door will remain in this position so long as there is no applied tension on the cable 78. Once tension is applied to the cable 78, the tension causes the door prop 50 to pivot upward (e.g., clockwise as shown in the FIGS. 1-7). Once the door prop 50 has pivoted sufficiently far, the projecting portion 48 of the door 42 is released form the hook-like third portion 62 of the door prop and the door is able to pivot downward under the bias of the spring 46. This release will occur at least when the operator 12 (FIG. 1) is ready to operate the mower since the operator will actuate the operator presence bail 34. It is possible that the collection bag 40 will be attached to the rear of the cutting platform 16. For such scenario, the door 42 will come to rest upon the top of the collection bag 40. As mentioned, the door prop 50 may or may not rest upon the projecting portion 48 of the door 42 at the surface 60.

Turning to operation of the walk-behind mower 10, attention is first directed to FIG. 2. It should be appreciated that the mower may be utilized with the door 42 located in a first, downward position. With the door 42 in the downward position, the door blocks the discharge of cut grass from the cutting platform 16. This position of the door 42 is useful for such operations such as grass mulching. It should be noted that that the door prop 50 does not engage the projecting portion 48 of the door 42.

As shown in FIG. 1, the walk-behind mower 10 may be utilized with the collection bag 40 mounted onto the cutting platform 16. The inlet of the collection bag 40 is mated to the discharge 24 of the cutting platform 16 such that cut grass is directed into the bag. Of course, the door 42 needs to be pivoted upwardly to expose the discharge 24 of the cutting platform 16 to the collection bag 40.

The position of the collection bag 40 on the rear of the cutting platform 16 is shown in FIG. 1. It should be appreciated that with this bag-mounted condition, the mower 10 may be operated to cut grass and thus have the grass collected into the collection bag 40. Of course, during such operation, the operator presence bail 34 is depressed and held against the handle of the mower to permit operation of the motor 18 and/or cutting blade within the cutting platform 16.

At some point in time, it will become desirable to remove the collection bag 40 from the rear of the cutting platform 16. Typically, this occurs when a sufficient amount of cut grass has accumulated within the collection bag 40.

Figure 6:
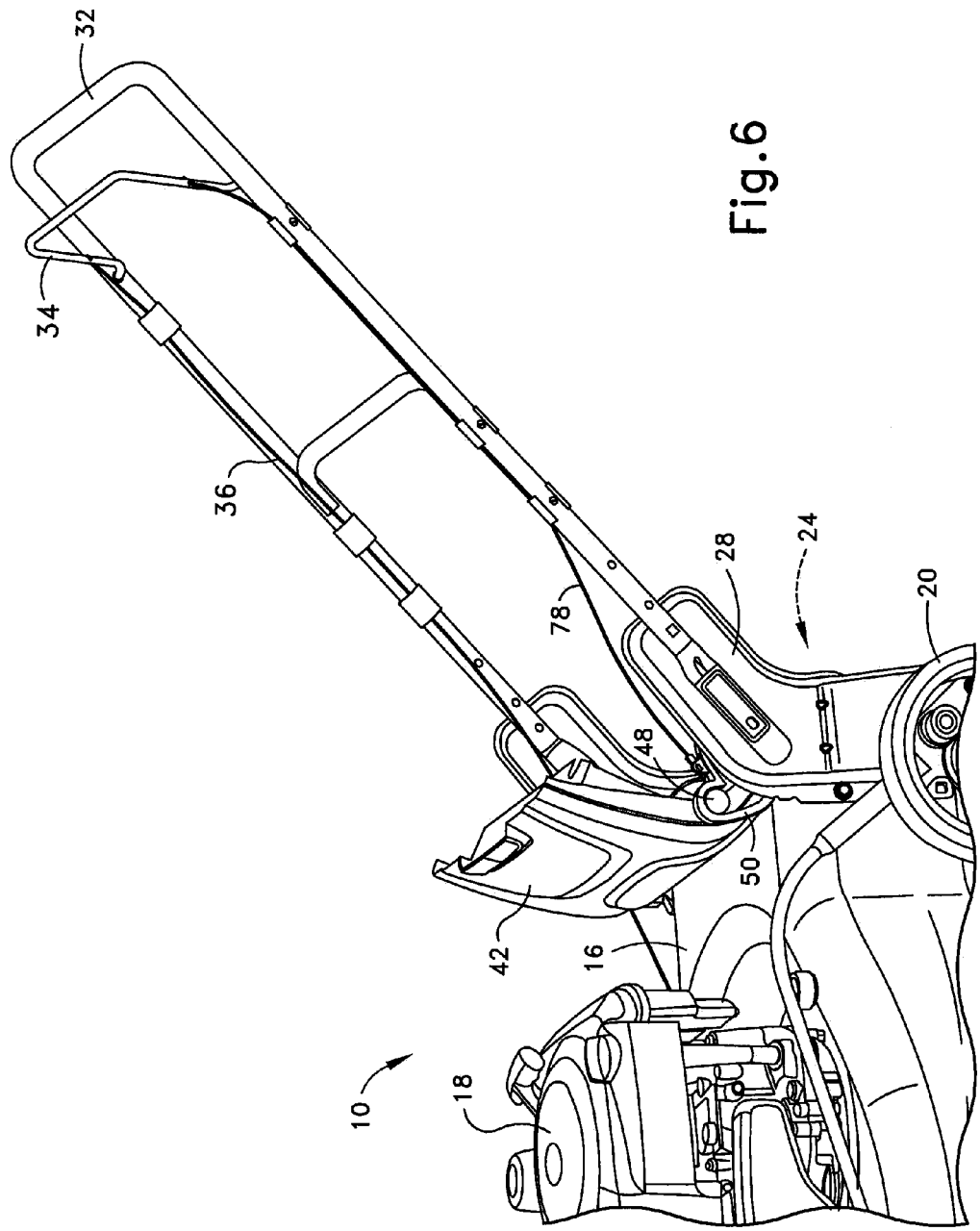
FIG. 6 is a perspective view of the mower of FIG. 1 and shows the door prop and the door in the positions shown in FIG. 3 and the bag removed for emptying.

Normally during operation of the mower with the collection bag 40 attached, the door 42 merely rests upon the top of the bag due to the bias from the spring 46. However, in order to efficiently remove the collection bag 40 from the cutting platform 16, it is preferable to lift the door 42 off of the top of the collection bag. Upon lifting of the door 42, the projecting portion 48 of the door 42 moves along the surface 60 of the door prop 50. The door prop 50 is biased in the counter-clockwise direction so that engagement of the projecting portion 48 against the surface 60 of the door prop 50 is generally maintained. This is especially true if it is recalled that during removal of the collection bag 40, the operator presence bail is released such that there is no tension being provided to the cable 78 to hold the door prop up. Eventually, the lifting of the door results in the projecting portion 48 moving to the hook-like third portion 62 at the distal end of the door prop 50. Due to the bias provided by the spring 72, the door prop 50 rotates in the counter-clockwise direction a small amount such that the projecting portion 48 of the door 42 is located in engagement with the curved segment 66. With the door prop 50 in engagement with the projecting portion 48 of the door 42, the door prop holds or props the door in the upward position. This is shown in FIG. 6. It is to be appreciated that FIG. 6 shows that operator presence bail 34 is not actuated and thus the door 42 is being held up.

With the door 42 held upward, away from the collection bag 40, the collection bag may be easily removed from the cutting platform 16. Once the mowing operation is to resume, the operator 12 will of course actuate the operator presence bail 34. Such actuation causes tension force to be applied to the cable 78. The tensioned cable pulls the door prop 50 in the clockwise direction. Once the projecting portion 48 of the door 42 clears the curved segment 66 at the distal end of the door prop 50, the spring 46 biases the door 42 and causes the door rotate in the clockwise direction. Thus, the door 42 can come again to rest on top of the collection bag 40.

In the alternative, if the operator 12 wishes to operate the mower 10 with the door 42 in a downward position to block the discharge 24 of the cutting platform 16, the operator will again actuate the operator presence bail 34 in order to operate the mower. At this point in time, the cable 78 again provides a pulling force to the door prop 50 such that the projecting portion 48 of the door 42 is released from the curved segment 66 at the distal end of the door prop 50. The door 42 again rotates in the clockwise direction under the bias of the spring 46 engaged with the door. With the absence of the collection bag 40, the door 42 continues to rotate in the clockwise direction until the door comes to rest against the cutting platform .16 in the downward position to block the discharge 24 of the cutting platform.

Figure 7:
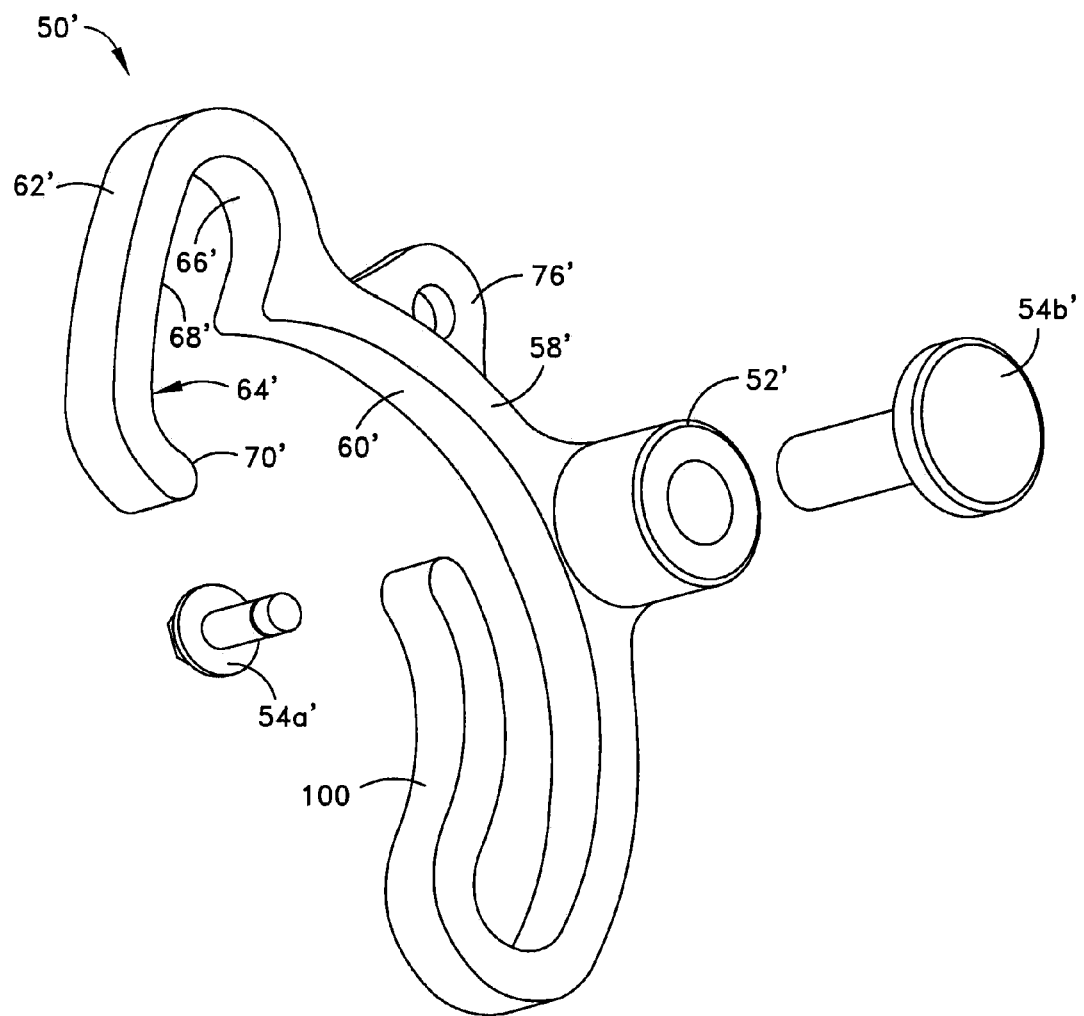
FIG. 7 is an alternative example embodiment of the door prop.

FIG. 7 shows one possible alternative embodiment for the door prop 50'. Similar structures within the embodiment of FIG. 7 are identified with the same reference numerals, but with "'" added. The embodiment of FIG. 7 includes a lower hook 100 to entrap the projecting portion 48 of the door 42 during part of the travel of the projection portion relative to the door prop 50'.

Of course, many other specific applications, configurations, and constructions are contemplated. It is to be understood that all of the specific applications are intended to be within the scope of the subject invention.

From the above description of the invention, those skilled in the art will perceive improvements, changes and modifications. Such improvements, changes and modifications within the skill of the art are intended to be covered by the appended claims.

The invention claimed is:

1. A walk-behind mower for cutting grass, the mower comprising:
    a cutting platform within which grass is cut and comprising a rearwardly directed discharge for cut grass;
    a door movably mounted relative to the cutting platform, wherein the door comprises a first door position in which the door at least partially blocks the discharge and a second door position in which the door is away from the discharge;
    a handle extending away from the cutting platform for gripping by an operator walking behind the mower in an operator location for operating the mower;
    an operable member that is operable by the operator when the operator is in the operator location, wherein the operable member is movably mounted on the handle; and
    a door prop movably mounted on the cutting platform, wherein the door prop comprises a pivot axis, wherein the pivot axis is fixed relative to the cutting platform, and wherein the door prop is configured to hold the door in the second door position and release the door from the second door position in response to operation of the operable member.

2. The mower of claim 1, wherein the door comprises a projecting portion for engaging the door prop.

3. The mower of claim 2, wherein the projecting portion slides along at least a portion of the door prop as the door is moved to the second door position.

4. The mower of claim 2, wherein the door prop comprises a hook, wherein an inner portion of the hook is configured to hold the projecting portion in the second door position, and wherein the hook is configured to rotate about the pivot axis responsive to the projecting portion contacting an outer portion of the hook as the door is moved to the second door position.

5. The mower of claim 2, wherein the projecting portion does not slide along any portion of the door prop after the door is released from the second door position.

6. The mower of claim 1, further comprising:
    a support fixed to the cutting platform to couple the handle to the cutting platform, wherein the door prop is movably mounted on the support.

7. The mower of claim 6, wherein the door is movably mounted on the support.

8. The mower of claim 6, further comprising a bracket fixed to the support, wherein the door prop is movably mounted on the bracket.

9. The mower of claim 8, further comprising:
    a biasing member configured to bias the door prop to engage the door to hold the door in the second door position, wherein the biasing member is coupled to the door prop and to the bracket.

10. The mower of claim 9, further comprising:
    a connector extending along a portion of the handle to transmit force from the operable in ember to facilitate an operation causing release of the door from the door prop, wherein the connector extends through an aperture formed in the door prop and an aperture formed in the bracket.

11. The mower of claim 1, further comprising:
    a biasing member configured to bias the door prop to engage the door to hold the door in the second door position; and
    a connector extending away from the operable member and towards the door prop, wherein the connector is configured to transmit force to the door prop to overcome the force of the biasing member and rotate the door prop about the pivot axis to release the door from the second door position in response to operation of the operable member.

12. The mower of claim 1, further comprising a collector for receiving and retaining cut grass, wherein the door rests on at least a portion of the collector after being released from the second door position.

13. A grass processing assembly for a walk-behind mower, the assembly comprising:
    a cutting platform within which grass is cut and comprising a rearwardly directed discharge for cut grass, the cutting platform supporting a handle for gripping by an operator walking behind the mower in an operator location for operating the mower, the handle supporting an operable member that is operable by the operator when the operator is in the operator location, wherein the operable member is movably mounted on the handle;

a door movably mounted on the cutting platform, wherein the door comprises a first door position in which the door at least partially blocks the discharge and a second door position in which the door is away from the discharge; and a door prop movably mounted on the cutting platform, wherein the door prop comprises a pivot axis, wherein the pivot axis is fixed relative to the cutting platform, and wherein the door prop is configured to hold the door in the second door position and release the door from the second door position in response to operation of the operable member.

14. The grass processing assembly of claim 13, wherein the door comprises a projecting portion for engaging the door prop.

15. The grass processing assembly of claim 14, wherein the door prop comprises a hook, wherein an inner portion of the hook is configured to hold the projecting portion in the second door position, and wherein the hook is configured to rotate about the pivot axis responsive to the projecting portion contacting an outer portion of the hook as the door is moved to the second door position.

16. The grass processing assembly of claim 13, further comprising:
a support fixed to the cutting platform, wherein the door prop is movably mounted on the support.

17. The grass processing assembly of claim 16, further comprising:

a bracket fixed to the support, wherein the door prop is movably mounted on the bracket;

a biasing member configured to bias the door prop to engage the door to hold the door in the second door position, wherein the biasing member is coupled to the door prop and to the bracket; and a connector extending along a portion of the handle to transmit force from the operable member to facilitate an operation causing release of the door from the door prop, wherein the connector extends through an aperture formed in the door prop and an aperture formed in the bracket.

18. The grass processing assembly of claim 13, further comprising:

a biasing member configured to bias the door prop to engage the door to hold the door in the second door position; and a connector extending away from the operable member and towards the door prop, wherein the connector is configured to transmit force to the door prop to overcome the force of the biasing member and rotate the door prop about the pivot axis to release the door from the second door position in response to operation of the operable member.

19. The grass processing assembly of claim 13, further comprising:

a collector for receiving and retaining cut grass, wherein the door rests on at least a portion of the collector after being released from the second door position.

20. The mower of claim 1, wherein the operable member comprises an operator presence bail, a blade brake control member, or blade clutch control member.

* * * * *